United States Patent Office 3,112,324
Patented Nov. 26, 1963

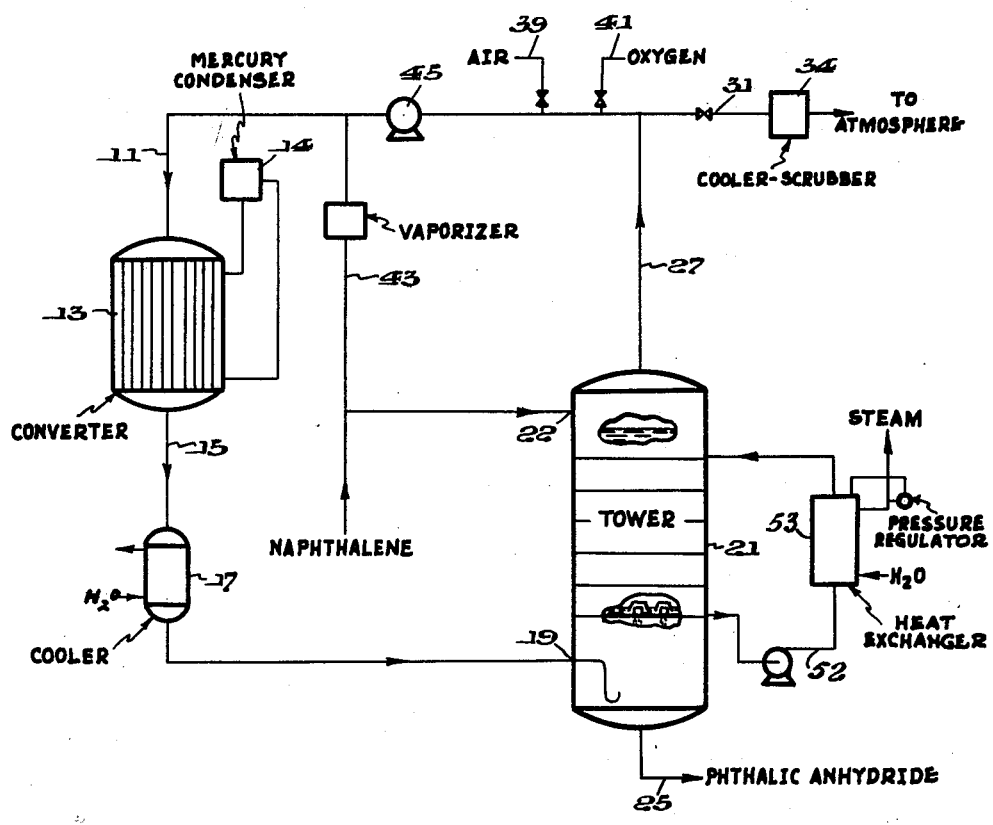

3,112,324
PRODUCTION OF PHTHALIC ANHYDRIDE
Harry G. Foucar, Glenshaw, Pa., assignor to Koppers Pittsburgh Company, Pittsburgh, Pa., a corporation of Delaware
Filed Jan. 13, 1960, Ser. No. 2,147
7 Claims. (Cl. 260—346.4)

This invention relates to the production of phthalic anhydride.

Phthalic anhydride is widely used in the production of resins and plasticizers. Phthalic anhydride is usually produced by the catalytic oxidation of orthoxylene or naphthalene; the oxidation of naphthalene being

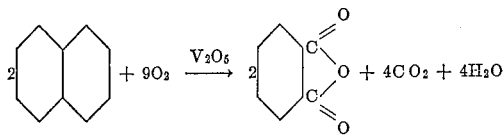

Numerous processes and equipment are known for effecting the reaction. In a commercial operation, for example, primary air is bubbled through a kettle of molten naphthalene to form a mixture of air and naphthalene vapors; secondary air is added to this mixture to obtain a desired ratio of oxygen to naphthalene; and then the mixture is passed through a catalytic converter (usually a series of small diameter tubes that are packed with a catalyst, for example vanadium oxide distributed upon a carrier such as alumina) where the mixture undergoes an exothermic reaction and the naphthalene is oxidized to phthalic anhydride. Carrying out the catalytic oxidation at too low a temperature results in incomplete oxidation and at too high a temperature results in oxidation beyond the desired extent. Accordingly, a cooling arrangement is provided so that the temperature in the converter is usually maintained between 300 and 600° C. A cooling arrangement may, for example, involve surrounding the tubes with a body of boiling mercury, condensing the mercury vapors, and returning the condensate to the body of mercury or the surrounding of the tubes with circulating Dowthern or other high boiling salts. Some of the sensible heat of the gaseous reaction products from the converter is removed by passing the gases through a vapor cooler that reduces their temperature to 120–160° C. The gases may be fed to large air-cooled condensers called "hay barns" where the crude phthalic anhydride crystallizes on the walls as long needles or "hay," or to alternating "switch" condensers where the phthalic anhydride condenses on oil-cooled pipes.

It has now been found that the phthalic anhydride can be recovered from the gaseous reaction products from the catalytic oxidation of naphthalene and the naphthalene for such oxidation can be vaporized by the direct contacting of the gaseous reaction products with naphthalene whereby the phthalic anhydride is condensed and the naphthalene is vaporized.

Conveniently, the recovering of the phthalic anhydride and the vaporizing of the naphthalene can be accomplished by flowing the gaseous reaction products in countercurrent contact with a flow of liquid naphthalene whereupon the gaseous reaction products give up their heat to the liquid naphthalene and the liquid naphthalene changes to vapor. Advantageously, this is accomplished by flowing the gaseous reaction products from the catalytic oxidation of naphthalene into one portion of a longitudinal extending zone, for example, at the lower portion of a conventional "bubble cap" or "packed" type distillation column as molten naphthalene is fed into another portion, for example at the upper portion of the column, whereby the gaseous reaction products flow countercurrent to the flow of naphthalene and in the example, liquid phthalic anhydride is obtained at the bottom portion of the column and vapors of naphthalene are obtained at the upper portion of the column.

In carrying out the recovery of the phthalic anhydride in accordance with this invention, molten naphthalene is fed into an upper portion of the longitudinal extending zone so that this zone has a temperature which at the upper portion is between 79 and 90° C. and increases down the zone until at the lower portion of the zone the temperature is at the temperature at which the phthalic anhydride condenses. Thus, phthalic anhydride is obtained at the lower portion of the zone and vapors of naphthalene obtained at the upper portion of the zone. These vapors of naphthalene may be fed to the converter to produce more phthalic anhydride.

The process of this invention can be carried out in simple and compact apparatus. Accordingly, such apparatus lends itself well to the use of automatic controls and instruments.

The above and further objects and novel features of the invention will appear more fully from the following detailed description when the same is read in connection with the accompanying drawing. It is to be expressly understood, however, that the drawing is not intended as a definition of the invention, but is for the purpose of illustration only.

The single sheet of drawing illustrates schematically apparatus for carrying out the process of this invention.

Turning now to the drawing, a gaseous mixture of naphthalene and oxygen, air, or other oxygen-containing gas at an inlet 11 enters a converter 13 which usually consists of a granular supported vanadium pentoxide catalyst either as a fixed bed packed in a series of small diameter tubes or as a fluidized bed. The mixture undergoes an exothermic reaction in the converter and the naphthalene is oxidized to phthalic anhydride. Since the reaction liberates 5000 to 6000 calories per kilogram of naphthalene entering the converter, a cooling arrangement is provided to maintain the reactor at a preset temperature, usually between 300 and 600° C. Cooling is accomplished in the embodiment illustrated herein by surrounding the tubes with a body of mercury. The exothermic heat released by the reaction causes the mercury to boil, the resulting mercury vapors are cooled in condenser 14 and the condensate returned to the body. Since the gaseous reaction products which leave the reactor outlet 15 contain a considerable amount of sensible heat, these gaseous reaction products are passed through a vapor cooler 17 where the hot gases by indirect heat exchange with water are cooled to a temperature from 120–160° C. The foregoing apparatus and process is conventional and is well known in the art.

In accordance with this invention, by bringing the gaseous reaction products from cooler 17 into direct contact with liquid naphthalene, the phthalic anhydride is condensed and the naphthalene is vaporized. To this end, the gaseous reaction products from the cooler 17 are fed to the lower inlet 19 of an elongated contact zone which may be of suitable construction such as a packed column, a plate column, or a bell and tray column, in the embodiment herein illustrated as a column 21 which has a plurality of plates. The gases introduced at the bottom inlet 19 flow upwardly and countercurrent to liquid naphthalene which enters at upper inlet 22 of the column and flows downwardly through the column. As the gases flow upwardly, the temperature of the gases decreases, the phthalic anhydride condenses, and the naphthalene absorbs the thermal energy and vaporizes. The behavior is believed to be similar to the distillation of a binary mixture, the lowest plate in column 21 contains substantially pure phthalic anhydride while each plate above will be substantially lower in phthalic anhydride until the uppermost plate is reached, and this plate will contain substantially no phthalic anhydride. Conversely, the liquid on the uppermost plate will be substantially comprised of naphthalene and the composition on each lower plate will be lower in naphthalene concentration. Thus, the temperature of the upper plate will be that of the naphthalene about 78–90° C. and the temperature of the bottom plate will be above the melting point of the phthalic anhydride, i.e. above 131° C. and preferably at about 140° C. The temperature of the plates above the lower plate proportionately decrease to the temperature of the upper plate.

The phthalic anhydride from the lower portion of the column 21 may be conducted by way of line 25 to a distillation column for further purification in a conventional manner.

In accordance with this invention, the vapors from column 21 flow by way of lines 27 and 29 to input conduit 11 for the converter 13. A portion of these vapors may be vented by way of line 31 so as to lower the nitrogen and carbon dioxide content of the vapors. The gases that are so vented may be passed through a condenser and a scrubber 34 where the gases may be scrubbed with a "wash oil" of coal or petroleum origin to remove traces of naphthalene.

Additional air or oxygen may be supplied by way of lines 39 and 41. Additional naphthalene, if desired, may also be supplied by way of line 43. A blower 45 feeds the vapor mixture into converter 13.

The heat of vaporization of the naphthalene will in most cases be sufficient to cool the tower contents without crystallization. Should the removal of additional heat (beyond that furnished by the evaporation of the naphthalene) be required, an external heat exchange may be used. Naphthalene turns to a solid at about 79° C., so the provision of additional cooling by refluxing of the overhead vapors is therefor difficult because of crystallization of the naphthalene on the cooling surface. A desirable cooling arrangement utilizes a pump circuit 52 and a heat exchanger 53 so designed that the difference in temperatures between the liquid entering the heat exchanger and that leaving the heat exchanger is slight (3° C. or less) but that the flow rate of the liquid is great enough that this slight temperature difference removes the additional heat. Conveniently, the naphthalene is taken from a plate in the tower and is cooled to a temperature between 80 and 131° by boiling the water on the shell side of the heat exchanger and controlling the boiling point of the water by a pressure controller. In this manner, the temperature of the naphthalene leaving the cooler is substantially the boiling temperature of the water at a desired pressure.

The foregoing process permits wide latitude in the conditions employed in the production of phthalic anhydride by the catalytic oxidation of naphthalene. The oxidation of naphthalene to phthalic anhydride under the conditions normally encountered in commercial operation utilizes about 1.28 pounds of oxygen for each pound of naphthalene. The oxygen concentration in the vapor mixture to the converter may be maintained within the range of 5 to 20% by volume. This oxygen is conveniently obtained by adding air to the naphthalene vapor but of course oxygen alone may be used, if desired. The volumetric ratio of gas to naphthalene vapor may vary widely depending upon the source of oxygen; with air the ratios may be as low as 85:1, and by recycling the naphthalene vapors in accordance with this invention may be as high as 500:1. Pressure is maintained on the gases so that the gases pass through the converter at a gauge pressure of from one to six atmospheres. While the cooling column for the reaction products from the converter is operated so that a liquid is present in each of the plates of the column, the rate at which naphthalene is added may range from that at which substantially all naphthalene is evaporated to that at which naphthalene leaves the column with the phthalic anhydride. Also the reflux for the column may be varied within wide range to control the column temperature and the amount of naphthalene available for the recycling. The rate of venting of the gas may range from a complete or 100% venting to 5% venting. The greater the rate of venting, of course, the more efficient must be the recovery of the naphthalene from the gas.

The foregoing has presented an arrangement for the continuous production of phthalic anhydride from naphthalene. The process and apparatus is compact, the tower accomplishes both the function of condensing the phthalic anhydride and vaporizing the naphthalene. The novel process provided safer operation than the heretofore used systems as the concentration of oxidizable materials is controlled. The process, because of its simplicity, lends itself well to the use of automatic equipment and instrumentation. Also, since the vapors are recycled, the problems of dispensing obnoxious materials is materially reduced.

I claim:

1. In a process where vapors of naphthalene are partially oxidized in a catalytic zone to produce gaseous reaction products containing phthalic anhydride, the improvement which comprises directly contacting said gaseous products with naphthalene in a longitudinally extending zone so as to condense the phthalic anhydride while vaporizing the naphthalene and separately removing liquid phthalic anhydride and vaporized naphthalene from said longitudinally extending zone.

2. In a process wherein vapors of naphthalene are partially oxidized in a catalytic zone to produce gaseous reaction products containing phthalic anhydride, the improvement which comprises directly contacting said gaseous products with naphthalene in a longitudinally extending zone so as to condense the phthalic anhydride while vaporizing the naphthalene; separately removing liquid phthalic anhydride and vaporized naphthalene from said longitudinally extending zone and feeding the vaporized naphthalene to said catalyst zone.

3. In a process wherein vapors of naphthalene are partially oxidized in a catalytic zone to produce gaseous reaction products containing phthalic anhydride, the improvement which comprises directly contacting the gaseous reaction products with naphthalene by countercurrent flow of the gaseous reaction products and liquid naphthalene in a longitudinally extending zone so as to condense the phthalic anhydride while vaporizing the naphthalene and separately selectively removing liquid phthalic anhydride and vaporized naphthalene from said longitudinally extending zone.

4. In a process wherein vapors of naphthalene are partially oxidized in a catalytic zone to produce gaseous reaction products containing phthalic anhydride, the improvement which comprises directly contacting the gaseous reaction products with naphthalene by countercurrent flow of the gaseous reaction products and liquid naphthalene in a longitudinally extending zone so as to condense the phthalic anhydride while vaporizing the naphthalene; separately removing liquid phthalic anhydride and vaporized naphthalene from said longitudinally extending zone, recovering the condensed phthalic anhydride and feeding the naphthalene so vaporized to said reaction zone.

5. A process for producing phthalic anhydride which comprises passing vapors of naphthalene and oxygen over a catalyst in a reaction zone so that the naphthalene is oxidized to gaseous reaction products including phthalic anhydride, feeding said reaction products into one end of a longitudinal contact zone, feeding naphthalene in the other end of said contact zone so that said products and naphthalene flow in direct countercurrent contact whereby said phthalic anhydride is condensed and the naphthalene is vaporized, separately removing liquid phthalic anhydride and vaporized naphthalene from said contact zone, recovering the condensed phthalic anhydride and feeding the vaporized naphthalene to said reaction zone.

6. A process for producing phthalic anhydride which comprises passing vapors of naphthalene and air over a catalyst so as to convert the naphthalene to phthalic anhydride, passing the resulting vapors through and in direct contact with liquid naphthalene in a contact zone at atmospheric pressure so as to condense the phthalic anhydride while vaporizing the naphthalene, separately removing liquid phthalic anhydride and vaporized naphthalene from said contact zone and recycling the vapors of naphthalene to the converter as the naphthalene to be converted to phthalic anhydride.

7. A process for producing phthalic anhydride which comprises passing vapors of naphthalene and oxygen containing gases at a pressure of one to three atmospheres and a temperature between 300 and 600° C. over a catalyst of vanadium pentoxide in an inert carrier so as to oxidize the naphthalene to phthalic anhydride, cooling the phthalic anhydride to 120–160° C., passing the cooled phthalic anhydride into the lower portion of a column having a plurality of bubble trays therein, passing liquid naphthalene into the upper portion of said column so as to bring the phthalic anhydride and liquid naphthalene into direct contact whereby the phthalic anhydride condenses and the naphthalene vaporizes, separately removing liquid phthalic anhydride and vaporized naphthalene from said column, recovering the condensed phthalic anhydride, and feeding the vapors of naphthalene to the converter.

References Cited in the file of this patent

UNITED STATES PATENTS

| | | |
|---|---|---|
| 1,691,903 | Mortimer | Nov. 13, 1928 |
| 2,140,140 | Pumnett | Dec. 13, 1938 |
| 2,222,870 | Kniskern | Nov. 26, 1940 |
| 2,519,481 | Kubie et al. | Aug. 22, 1950 |
| 2,595,254 | Hemminger | May 6, 1952 |

OTHER REFERENCES

Sherwood: Petroleum Refiner, vol. 32, No. 3 (1953), pages 113–17.